No. 702,207. Patented June 10, 1902.
S. E. HARSH.
REIN SUPPORT.
(Application filed July 22, 1901.)
(No Model.)

Witnesses:
E. E. Duffy
E. Hugh Duffy

Inventor
S. E. Harsh,
per O. E. Duffy, Att'y.

THE NORRIS PETERS CO., PHOTO-LITHO., WASHINGTON, D. C.

UNITED STATES PATENT OFFICE.

SAMUEL E. HARSH, OF WABASH, INDIANA.

REIN-SUPPORT.

SPECIFICATION forming part of Letters Patent No. 702,207, dated June 10, 1902.

Application filed July 22, 1901. Serial No. 69,185. (No model.)

*To all whom it may concern:*

Be it known that I, SAMUEL E. HARSH, a citizen of the United States, residing at Wabash, in the county of Wabash and State of Indiana, have invented certain new and useful Improvements in Rein-Supports; and I do hereby declare the following to be a full, clear, and exact description of the invention, such as will enable others skilled in the art to which it appertains to make and use the same.

My invention relates to "rein-supports," and has for its object to provide a device of the class which can be instantly attached to and as quickly detached from the hip-strap of harness without interfering in any way with said strap or harness-buckles.

A further object of my invention is to provide a rein-support which can be attached and held in position on the hip-strap without perforating or marring in any way said hip-strap.

A further object of my invention is to provide a rein-support which when attached cannot under any conditions accidentally become detached.

A further object of my invention is to provide a rein-support which is particularly adapted to long and hard usage and which is therefore simple, strong, and durable.

With all these objects in view my invention consists in the novel construction of a rein-support.

My invention also consists in the novel manner of attaching said rein-support to harness.

Figure 1:
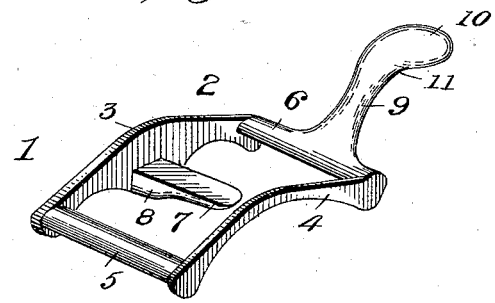
Figure 2:
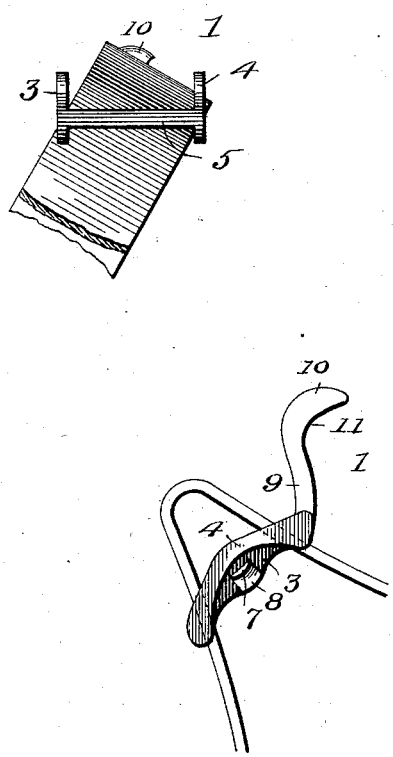
Figure 3:
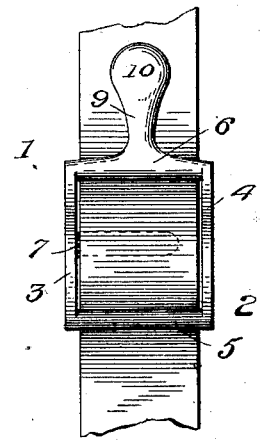
Figure 4:
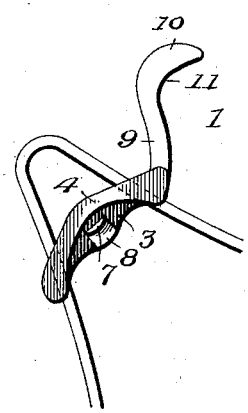

Referring to the accompanying drawings, Figure 1 is a perspective view of my rein-support. Fig. 2 is an end view showing manner of attaching the same to a strap. Fig. 3 is a top plan of my rein-support in an operative position, and Fig. 4 is a side elevation showing the strap loose with rein-support still in position.

Like numerals of reference indicate the same parts throughout the several figures, in which—

1 is my rein-support, composed of the square frame 2, having parallel side bars 3 and 4, said side bars being slightly upwardly curved, their highest point being the center thereof.
At the center of side bar 3 and on the same plane with the end bars 5 and 6 and parallel therewith is the central bar 7, having a flat top and extending almost entirely across to side bar 4, said central bar being reinforced at 8 in order to stiffen the same.

Secured on end bar 6 is the rein-supporting prong 9, having a rounded head 10, said prong being curved at 11 in order to hold the rein more secure.

Having thus described the several parts of my invention, its operation is as follows: The rein-support is attached, as shown in Fig. 2, by forming a loop of the strap and inserting the end thereof between the side bar 4 and central bar 7. When said strap is thus inserted, it is straightened out and the rein-support is in position. When the strap is straight, however, the rein-support cannot move, but stays as firmly in place as though the support were provided with a tongue. When, however, it is desired to move or adjust said support, the same is easily done by slightly bending the strap and then sliding the support to the desired position.

Having thus described my invention, I do not wish to be understood as limiting myself to the exact construction as herein set forth, as various slight changes in form and construction may be made which would fall within the limit and scope of my invention, and I consider myself clearly entitled to all such changes and modifications.

What I claim as new, and desire to secure by Letters Patent of the United States, is—

In a rein-support, the combination of the end bars, a rein-supporting prong secured to one of said bars, side bars secured to said end bars, a central bar integral with one side bar extending therefrom and reaching almost to the opposite side bar, whereby said rein-support is secured to a strap by means of inserting said strap edgewise between said central bar and said side bar, and securely held in position by said side bars, substantially as described.

In testimony whereof I affix my signature in presence of two witnesses.

SAMUEL E. HARSH.

Witnesses:
 LOY WILSON,
 FRANK LEGO.